United States Patent
Schmid et al.

(10) Patent No.: US 7,782,163 B2
(45) Date of Patent: Aug. 24, 2010

(54) SET WITH A POSITION SENSOR AND AN EXCITER PART

(75) Inventors: Max Schmid, Wangs (CH); Fouad Mahdi, Bonaduz (CH)

(73) Assignee: Pilz Auslandsbeteiligungen GmbH, Ostfildern (DE)

( * ) Notice: Subject to any disclaimer, the term of this patent is extended or adjusted under 35 U.S.C. 154(b) by 373 days.

(21) Appl. No.: 11/806,413

(22) Filed: May 31, 2007

(65) Prior Publication Data

US 2007/0279167 A1  Dec. 6, 2007

(30) Foreign Application Priority Data

Jun. 1, 2006  (CH) ..................... 0879/06

(51) Int. Cl.
*H01H 9/00* (2006.01)
*H01H 1/66* (2006.01)

(52) U.S. Cl. ............... 335/207; 335/152; 335/206; 340/542; 324/207.2

(58) Field of Classification Search ......... 335/205–207, 335/229, 151–154; 340/340, 542; 324/207.2
See application file for complete search history.

(56) References Cited

U.S. PATENT DOCUMENTS

| | | | | |
|---|---|---|---|---|
| 3,873,902 A | * | 3/1975 | Burch .................. 318/594 |
| 4,855,719 A | * | 8/1989 | Posey .................. 335/207 |
| 4,888,986 A | * | 12/1989 | Baer et al. ............ 73/170.09 |
| 4,967,792 A | * | 11/1990 | Magee ................. 137/552 |
| 5,621,317 A | * | 4/1997 | Wozniak .............. 324/207.13 |
| 7,385,505 B2 | * | 6/2008 | Bilodeau ............. 340/547 |
| 7,679,479 B2 | * | 3/2010 | Edmonson, Jr. ...... 335/207 |
| 2007/0279048 A1 | * | 12/2007 | Schmid et al. ....... 324/207.24 |
| 2008/0074101 A1 | * | 3/2008 | Dobler et al. ........ 324/207.2 |

* cited by examiner

*Primary Examiner*—Elvin G Enad
*Assistant Examiner*—Bernard Rojas
(74) *Attorney, Agent, or Firm*—Buchanan Ingersoll & Rooney PC

(57) ABSTRACT

A set is disclosed with a position sensor and an exciter part. The position sensor has three reed contacts which are pointed parallel to one another in a triangle arrangement next to one another, of which the first two are used for doubled detection of the exciter magnetic field. The third reed contact is used to generate an error signal when the sensor is activated by means of an outside magnetic field. The exciter part has three permanent magnets which are arranged in a triangle arrangement which corresponds to the triangle arrangement of the reed contacts, with pole axes aligned parallel to one another. Of them, the first two magnets are pointed in the same direction and are located at a first distance to one another. The third magnet is polarized in the direction opposite the first two. This results in that only the two make contacts can be activated by the two bar magnets which are pointed in the same direction. Conversely, all three reed contacts are activated each by an outside magnetic field. This yields a manipulation-safe proximity switch.

24 Claims, 2 Drawing Sheets

SET WITH A POSITION SENSOR AND AN EXCITER PART

RELATED APPLICATIONS

This application claims priority under 35 U.S.C. §119 to Swiss Application 00879/06 filed in Switzerland on Jun. 1, 2006, the entire contents of which are hereby incorporated by reference in their entireties.

TECHNICAL FIELD

A position sensor is disclosed with a magnetic exciter part to activate the sensor, the sensor and the exciter part being structurally matched to one another.

SUMMARY

A position sensor is disclosed which can be activated by approaching a magnetic exciter part, but cannot be activated by outside magnetic fields. Moreover the sensor should be built very simply.

In a set with a position sensor and an exciter part, the position sensor has three reed contacts which are pointed parallel to one another in a triangle arrangement next to one another. The first reed contact and the third reed contact are connected either in series or in parallel. If they are connected in series, the first reed contact is a make contact and the third reed contact is a break contact. If they are connected in parallel, the first reed contact is a break contact and the third reed contact is a make contact. The second reed contact can be a break contact or a make contact in both versions. The exciter part is equipped with three bar magnets which are arranged in a triangle arrangement which corresponds to the triangle arrangement of the reed contacts. The north-south axes of these bar magnets are aligned parallel to one another. Of these bar magnets, the first two magnets are pointed in the same direction and are arranged at a first distance to one another. The third magnet is polarized in the direction opposite the first two. It is therefore possible to arrange the first two with north pointed against the reed contacts, then the third is arranged with south in this direction. Or it is conversely possible to arrange the first two magnets with their south pole in the direction of the reed contacts of the position sensor. In this case the third bar magnet is pointed with its north pole in this direction.

This arrangement of three magnets in a triangle configuration which corresponds to the triangle arrangement of three reed contacts which are aligned in parallel allows switching the first two reed contacts with the magnets without likewise switching the third reed contact. This is because the oppositely pointed pole of the third magnet distorts the magnetic fields of the first two magnets such that the third reed contact is not activated in the position opposite the magnets, but the first two are activated.

The exciter part and position sensor can approach in the axial direction of the magnet pole axes. This can also take place perpendicular thereto in one direction from the first to the third sensor or from the first to the third bar magnet, or vice versa. Movement of the exciter part in the direction from the first to the second magnet or vice versa in the meantime leads to ambiguous sensor signals. This direction of motion more accurately leads to the first two reed contacts being activated in succession and to the third reed contact being likewise activated over a short path before activation of the first two reed contacts. In the other directions of motion however the first two reed contacts are activated together without the third being activated. This pattern, in contrast to the other, is suitable for a safety position sensor.

The third magnet and the third reed contact are advantageously arranged and designed such that the third magnet acts with a smaller magnetic field on the third reed contact than the first two magnets on the first two reed contacts. This has the advantage that the effect of the first two magnets on the first two reed contacts is only slightly influenced by the third magnet. The smaller effect is however sufficient to protect the third reed contact against the magnetic field of the first two bar magnets which activates it.

This reduced effect of the third magnet can be achieved by the third magnet having a smaller magnetic field, therefore being less strong than each of the first two magnets. But it can also be achieved by the distance between the third magnet and the third reed contact being greater than the distance between the first magnet and the first reed contact, or the second magnet and the second reed contact. The distance of the first two magnets to the respectively opposite reed contact is as identical as possible.

This greater distance can be achieved by the third reed contact being arranged offset relative to the first two reed contacts in the position sensor, or by the third magnet being arranged offset relative to the first two magnets in the exciter part.

In order to prevent manipulation with the third reed contact, i.e. activation of the sensor by outside magnetic fields, the third reed contact is connected in series to the first reed contact. An outside magnetic field in any case will activate all reed switches. Since the first and the third reed contact switch opposite one another, a magnetic field can never cause the first and the second reed switches to be closed. A logic circuit which is connected to the sensor will understand the signal produced by an outside magnetic field as an error signal since the electrical connection through the first and the third reed contact is interrupted while the connection through the second reed contact is established.

The third reed contacts are advantageously potted together in the sensor body.

DESCRIPTION OF THE DRAWINGS

Figure 1:
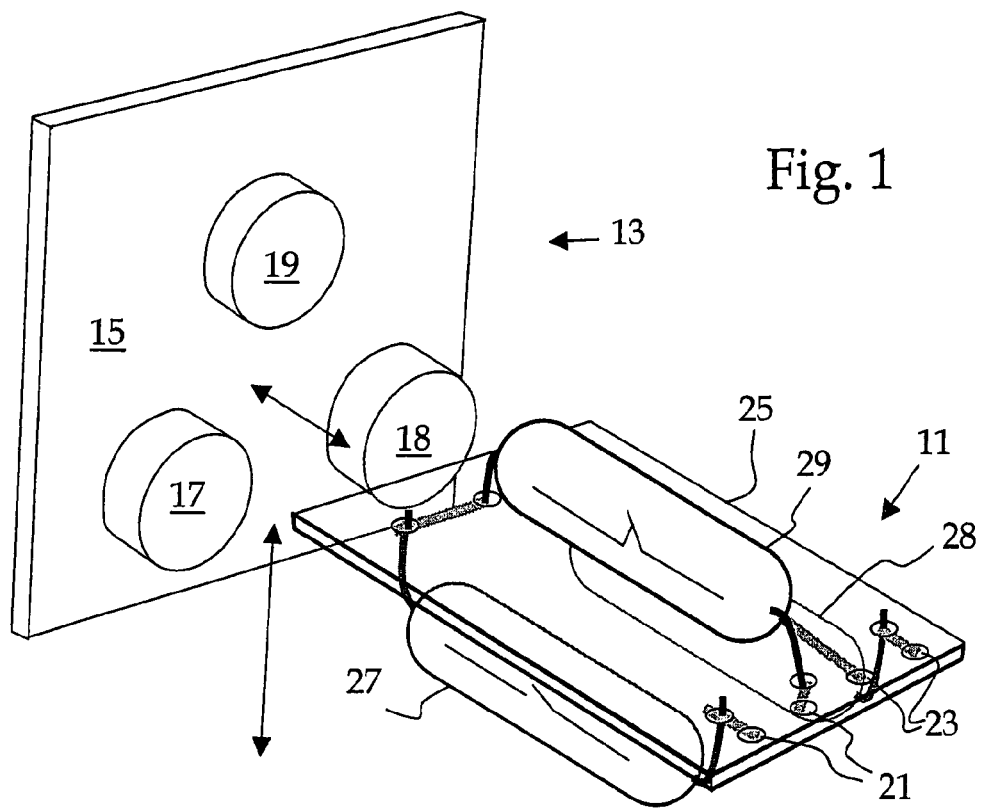

Brief description of the figures:

FIG. 1 shows a perspective sketch of such an exemplary set with a position sensor and an exciter part.

Figure 2:
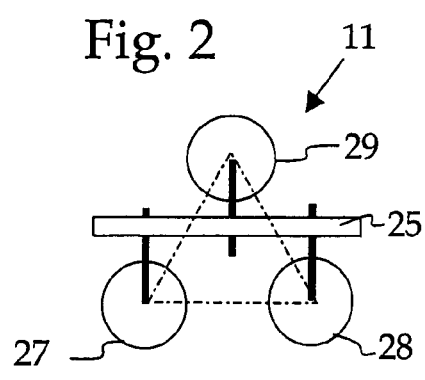

FIG. 2 shows a view of an exemplary sensor in the axial direction of the reed contacts.

Figure 3:
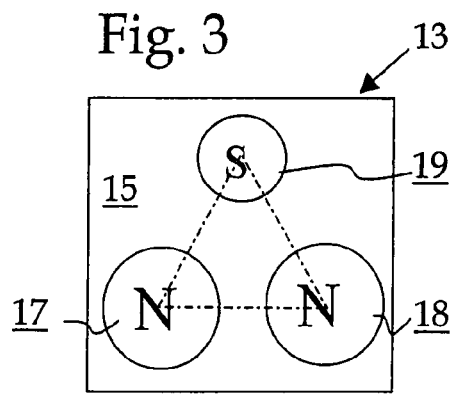

FIG. 3 shows an exemplary view of the three bar magnets.

Figure 4:
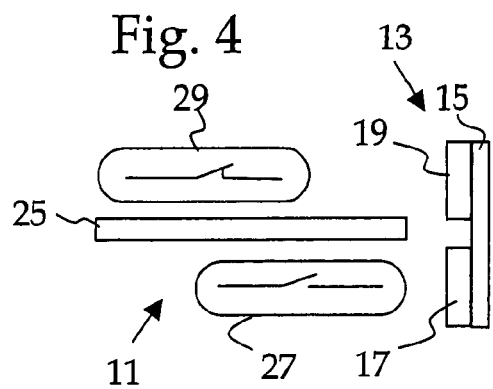

FIG. 4 shows a side view of a second exemplary embodiment with reed contacts arranged staggered in the sensor and the exciter part.

Figure 5:
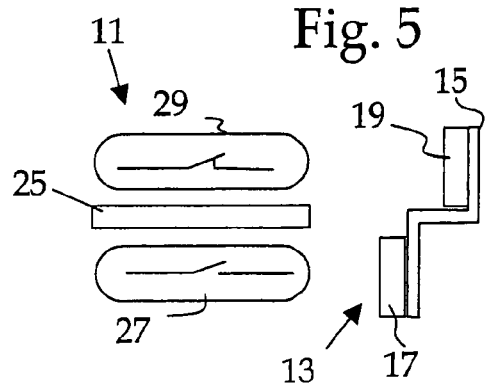

FIG. 5 shows a side view of a third exemplary embodiment with magnets arranged in the sensor and staggered in the exciter part.

FIG. 6 shows four possible schematics for exemplary connection of the three reed contacts.

DETAILED DESCRIPTION

The exemplary set shown in FIGS. 1, 2 and 3 has a sensor 11 and an exciter part 13. The exciter part consists of a base plate 15 and three bar magnets 17, 18, 19 thereon. The bar magnets 17, 18, 19 are arranged in a triangle arrangement. The two larger bar magnets 17 and 18 are pointed with their north pole towards the sensor 11. The smaller third bar magnet 19 is weaker than the first two and is pointed with the south pole toward the sensor.

The three bar magnets are shown seated on a base plate. They can also be inlet into a base plate 15.

The exemplary sensor 11 is comprised of the three reed contacts 27, 28, 29 which can be moved into the position as shown in FIG. 1 to the exciter part 13 for their proper activation. The reed contacts 27, 28, 29 are arranged in a triangle arrangement. The axes of the reed contacts run through the three corners of a triangle which is equilateral in this case. More generally expressed it is an isosceles triangle, the axis of the third reed contact 29 running through the corner in which the two identical legs come together. The three reed contacts are located on a board 25 which has terminals 21, 23 for the connecting cables. The first and the second reed contacts 27, 28 are make contacts. The third reed contact 29 is a break contact (The reverse arrangement with the first two reed contacts as break contacts and the third reed contact as a make contact is likewise possible). The first reed contact 27 and the third reed contact 29 are connected in series via the printed conductors on the board 25. The terminals 21 are then connected to one another when the first reed contact 27 is activated by the magnetic field of the first magnet 17; the third reed contact however is not activated. The second reed contact 28 is located parallel to the first reed contact 27. The first reed contact 27 is therefore always closed or opened at the same time as the second reed contact 28. The terminals 23 are then connected to one another when the second reed contact 28 is activated.

The equilateral triangle which is shown by the dot-dash line in FIGS. 2 and 3 illustrates that the two exemplary triangle arrangements of the reed contacts and magnets of a set can be made the same.

FIG. 4 shows a second exemplary embodiment in which the third reed contact is located on the board 25 pushed in the lengthwise direction relative to the first two reed contacts. It is therefore less strongly influenced by the magnets 17, 18, 19. The magnetic field of the first two magnets 17, 18 is moreover attenuated by the third magnet 19 which is polarized oppositely. Therefore the third reed contact is not switched by the approach of the exciter part 13.

FIG. 5 shows a third exemplary embodiment in which the third magnet 19 is arranged on the base plate 15 set back relative to the first two magnets 17, 18. This has essentially the same effect.

FIG. 6 shows four schematic diagrams in which the three reed contacts 27, 28, 29 are combined into two printed conductors and can have three different switching patterns. Aside from these schematic diagrams, it is also possible to tap the three reed contacts individually and to analyze the circuit state of the sensor with downstream logic.

Figure 6A:
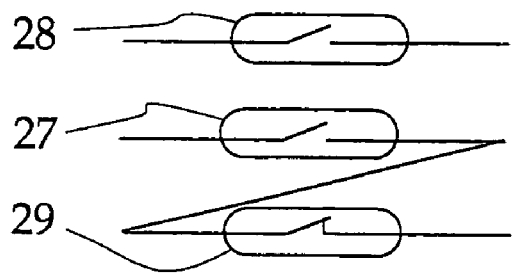
Figure 6B:
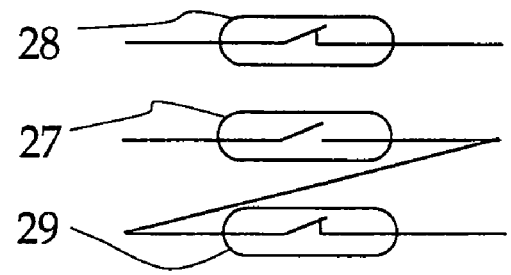

In FIGS. 6a and 6b the first reed contact 27 and the third reed contact 29 are connected in series. In the series connection it is necessary for the first reed contact to be a make contact and for the third to be a break contact in order to obtain an unambiguous sensor signal. The second reed contact can be a break contact (FIG. 6b) or a make contact (FIG. 6a).

Figure 6C:
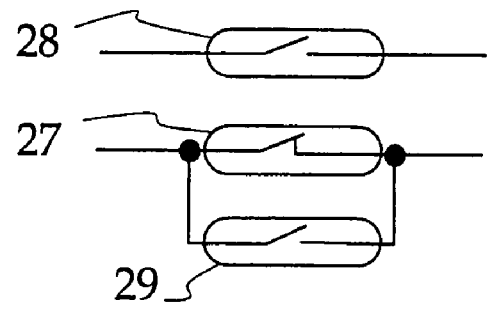
Figure 6D:
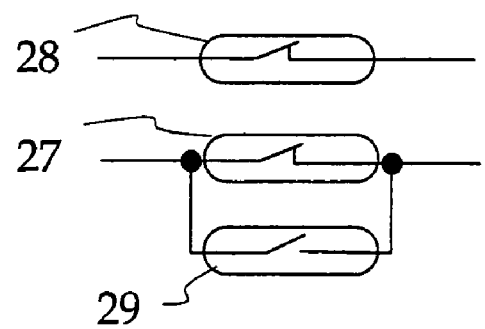

In FIGS. 6c and 6d the first reed contact 27 and third reed contact 29 are connected in parallel. This requires that the first reed contact 27 be a break contact and the third reed contact 29 be a make contact so that unambiguous sensor signals are generated. The second reed contact can again be a break contact or a make contact here.

The state of the reed contacts is analyzed with a logic circuit (e.g., with an electronic component). For the cited circuits the following applies:

| | Diagram | | | | | | | |
|---|---|---|---|---|---|---|---|---|
| | 6a | | 6b | | 6c | | 6d | |
| | Reed contacts | | | | | | | |
| | 27/29 | 28 | 27/29 | 28 | 27/29 | 28 | 27/29 | 28 |
| Activated by the exciter part | 1 | 1 | 1 | 0 | 0 | 1 | 0 | 0 |
| Not activated | 0 | 0 | 0 | 1 | 1 | 0 | 1 | 1 |
| Activated by the outside magnetic field | 0 | 1 | 0 | 0 | 1 | 1 | 1 | 0 |

If the reed contacts are tapped individually, each reed contact independently of the other can be a break contact or a make contact. The logic circuit can be configured accordingly such that the open position and closed position of the individual reed contacts are correctly interpreted.

In summary, disclosed is a set with a position sensor 11 and an exciter part 13. The position sensor 11 has three reed contacts 27, 28, 29 which are pointed parallel to one another in a triangle arrangement next to one another, of which the first two contacts 27, 28 are used for doubled detection of the magnetic field of the exciter part. They are located at a first distance from one another. The third reed contact 29 is used to generate an error signal if an outside magnetic field is acting on the reed contacts. The exciter part 13 has three bar magnets 17, 18, 19 which are arranged in a corresponding triangle arrangement, with north-south axes aligned parallel. Of them, the first two magnets 17, 18 are polarized the same and are located at a first distance to one another. The third magnet 19 is polarized in the direction opposite the first two. This results in that only the first two reed contacts 27, 28 can be activated by the two bar magnets 17, 18 which are pointed in the same direction. Conversely all three reed switches 27, 28, 29 are activated each by an outside magnetic field. This yields a manipulation-safe proximity switch.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A set comprising:
    a position sensor; and
    an exciter part,
    wherein the position sensor includes first, second, and third reed contacts which are each pointed toward the exciter part and arranged substantially in a triangular arrangement,
        wherein the first and second reed contacts are located at a first distance from one another and are configured for doubled detection of a magnetic field of the exciter part,
        wherein the third reed contact is configured to generate an error signal when the third reed contact is activated,
    wherein the exciter part includes first, second, and third magnets which are arranged in a triangular arrangement corresponding to the triangular arrangement of the first, second, and third reed contacts, respectively, the first, second, and third magnets having corresponding pole axes which are aligned substantially parallel to one another, wherein pole axes of the first and second magnets are pointed in substantially the same direction and are located at the first distance to one another in order to be able to be aligned flush with the first and second reed contacts, respectively, in an activating position, and wherein the third magnet, which corresponds to the second magnetic field of the exciter part, is polarized in a direction opposite to a polarization of the first and second magnets.

2. The set as claimed in claim 1, wherein the third magnet and the third reed contact are arranged and designed such that the third magnet applies a smaller magnetic field on the third reed contact than a magnetic field applied by the first and second magnets on the first and second reed contacts.

3. The set as claimed in claim 2, wherein the third magnet has a smaller magnetic field than each of the first and second magnets.

4. The set as claimed in claim 2, wherein a distance between the third magnet and the third reed contact is greater than at least one of a distance between the first magnet and the first reed contact and a distance between the second magnet and the second reed contact.

5. The set as claimed in claim 2, wherein the third reed contact is arranged offset relative to the first and second reed contacts in a lengthwise direction of the reed contacts.

6. The set as claimed in claim 2, wherein the third magnet is arranged offset relative to the first two magnets in the direction of the pole axes.

7. The set as claimed in claim 1, wherein the third reed contact is a break contact,
wherein the first reed contact is a make contact, and
wherein the third reed contact is connected in series to the first reed contact.

8. The set as claimed in claim 1, wherein the third reed contact is a make contact,
wherein the first reed contact is a break contact, and
wherein the third reed contact is connected parallel to the first reed contact.

9. The set as claimed in claim 1, wherein the first, second, and third reed contacts are each potted in a body of the position sensor.

10. The set as claimed in claim 1, wherein the first and second magnets have magnetic fields corresponding to one another.

11. The set as claimed in claim 3, wherein a distance between the third magnet and the third reed contact is greater than one of a distance between the first magnet and the first reed contact and a distance between the second magnet and the second reed contact.

12. The set as claimed in claim 4, wherein the third reed contact is arranged offset relative to the first and second reed contacts in a lengthwise direction of the reed contacts.

13. The set as claimed in claim 5, wherein the third magnet is arranged offset relative to the first two magnets in the direction of the pole axes.

14. The set as claimed in claim 6, wherein the third reed contact is a break contact,
wherein the first reed contact is a make contact, and
wherein the third reed contact is connected in series to the first reed contact.

15. The set as claimed in claim 7, wherein the third reed contact is a make contact,
wherein the first reed contact is a break contact, and
wherein the third reed contact is connected parallel to the first reed contact.

16. The set as claimed in claim 8, wherein the first, second, and third reed contacts are each potted in a body of the position sensor.

17. The set as claimed in claim 9, wherein the first and second magnets have magnetic fields corresponding to one another.

18. A set comprising a position sensor and an exciter part, wherein the position sensor comprises:

two first reed contacts disposed at a first distance from one another and configured to detect a magnetic field produced by the exciter part; and a third reed contact configured to generate an error signal when the third reed contact is activated, the two first reed contacts and the third reed contact being disposed in a triangular arrangement, and wherein the exciter part comprises three magnets which are arranged in a triangular arrangement corresponding to the triangular arrangement of the reed contacts, the magnets having corresponding pole axes which are aligned substantially parallel to one another, wherein a third one of the three magnets is polarized in a direction opposite to a polarization of a first one and a second one of the three magnets.

19. The set as claimed in claim 18, wherein the magnetic field of the exciter part includes a first magnetic field produced by the first and second magnets, and a second magnetic field produced by the third magnet, and wherein the first magnetic field applied to the first and second reed contacts, respectively, is greater than the second magnetic field applied to the third reed contact by the third magnet.

20. The set as claimed in claim 18, wherein each of the magnets is a bar magnet.

21. The set as claimed in claim 1, wherein each of the magnets is a bar magnet.

22. The set as claimed in claim 1, wherein the magnetic field of the exciter part includes a first magnetic field produced by the first and second magnets, and a second magnetic field produced by the third magnet, and wherein the first magnetic field applied to the first and second reed contacts, respectively, is greater than the second magnetic field applied to the third reed contact by the third magnet.

23. The set as claimed in claim 1, wherein the magnetic field of the exciter part includes a first magnetic field produced by the first magnet, a second magnetic field produced by the second magnet, and a third magnetic field produced by the third magnet, and wherein the first magnetic field applied to the first reed contact by the first magnet and the second magnetic field applied to the second reed contact by the second magnet are each greater than the third magnetic field applied to the third reed contact by the third magnet.

24. The set as claimed in claim 18, wherein the magnetic field of the exciter part includes a first magnetic field produced by the first magnet, a second magnetic field produced by the second magnet, and a third magnetic field produced by the third magnet, and wherein the first magnetic field applied to the first reed contact by the first magnet and the second magnetic field applied to the second reed contact by the second magnet are each greater than the third magnetic field applied to the third reed contact by the third magnet.

* * * * *